Dec. 9, 1958 L. T. WHITEHEAD 2,863,474
DUCTING FOR HIGH TEMPERATURE FLUIDS
Filed June 21, 1954

Inventor
Leslie Thomas Whitehead
BY
Attorneys

2,863,474
DUCTING FOR HIGH TEMPERATURE FLUIDS

Leslie Thomas Whitehead, Farnborough, England, assignor to Power Jets (Research and Development) Limited, London, England, a British company Application June 21, 1954, Serial No. 438,164

Claims priority, application Great Britain June 26, 1953

3 Claims. (Cl. 138—47)

This invention relates to ducting for high temperature fluid flow systems, for example, gas turbine plant. An object of the invention is to provide means whereby the location of structure attached to the wall of the ducting and relative to which said wall is free to move is, to at least some extent, independent of thermal distortion of the ducting. A further object of the invention is to permit freedom of differential movement due to thermal distortion between the ducting and structure attached to the wall thereof while maintaining the ducting fluid-tight.

The invention consists in the combination of a ducting having a tubular wall, structure relative to which said wall is free to move longitudinally and an interconnection between said wall and said structure, comprising a continuous annular band extending peripherally of the wall, the band having two annular flanges secured to said wall and spaced longitudinally therealong an annular intermediate section attached to the structure and extending longitudinally adjacent said wall and radially spaced therefrom, and two annular bellows sections each flexible longitudinally of the wall and one attached to one flange and to one end of the intermediate section, and the other bellows section attached to one flange and the other end of the intermediate section whereby the intermediate section has a limited freedom of movement longitudinally of the wall and so affords a means of attachment to the wall to the structure wherein said means of attachment is unaffected by longitudinal expansion of the wall.

The annular band may embrace the ducting externally or be disposed internally of the ducting. The structure attached to the intermediate section is one relative to which the ducting wall moves longitudinally due to thermal expansion and contraction and may be disposed internally or externally of the ducting, or partly both. Where the structure passes from the intermediate section through the wall of the ducting the latter is apertured to provide clearance between wall and structure. The band will conveniently envelop the aperture so as to maintain the ducting fluid-tight.

The foregoing and other features of the invention may be understood from the constructional embodiments of the invention now described with reference to the accompanying drawing. In the drawing.

Figure 1:
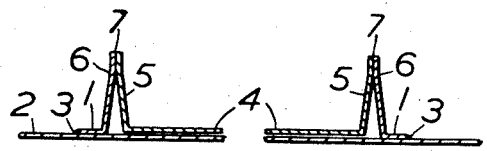
Figure 1 is a part transverse section of a duct and band.

In the proposed construction of the band for providing means for attaching structure to the tubular wall of the duct shown in transverse cross-section in Figure 1, the two annular flanges 1 extend longitudinally of the ducting (so as to be, in the case of a circular-sectioned ducting, of cylindrical form) and abut against the tubular wall 2 of the ducting, being attached thereto continuously around the circumference of the ducting at longitudinally spaced positions therealong by welds 3. The annular intermediate section 4 likewise extends longitudinally of the ducting but is disposed with a slight radial clearance from the wall of the ducting so as to be a sliding fit in or over the wall of the ducting. The ends 5 of the annular intermediate section are upset away from the ducting to form a channel extending peripherally of the ducting whose sides are at an obtuse angle to the intermediate section. The adjacent ends 6 of the flanges are similarly upset at an obtuse angle to the flanges. Thus the upset portions on the intermediate section and each flange converge away from the duct wall and are welded together peripherally at the point of convergence 7 to form a bellows section, flexible longitudinally of the ducting. The intermediate section has limited freedom of movement longitudinally of the wall and so affords a means of attachment of the wall to the structure, which means is unaffected by longitudinal expansion of the wall.

Figure 2:
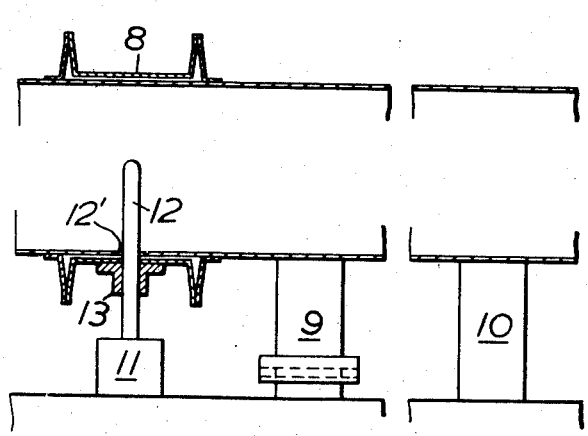
Figures 2 and 3 are respectively longitudinal and transverse cross-sections of a ducting having a fixed external instrument responsive to a condition within the ducting.
Figure 3:
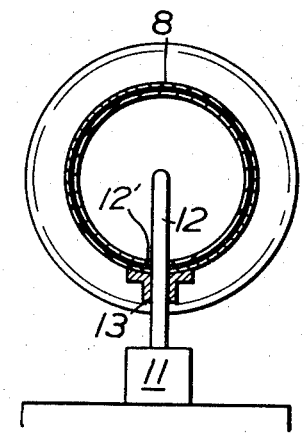

In the constructional embodiment of the invention shown in longitudinal and transverse section in Figures 2 and 3, a circular-sectioned duct is embraced by a continuous annular band 8 constructed in the manner described above. The ducting is mounted on longitudinally spaced feet 9, 10 one of which, 9, is slidable longitudinally of the ducting. An instrument 11 for indicating a condition of the ducted fluid comprising a stationary pedestal externally of the ducting and constitutes structure relative to which the duct moves longitudinally.

The instrument 11 has a probe portion 12 extending through the band 8 and duct wall 2 into the ducting and the probe portion passes through a fluid-tight bush 13 on the intermediate section of the band by means of which attachment is made between that section and the structure. The duct wall is apertured inward of the bush to afford a slight clearance 12' round the probe. In this way the duct is able to expand longitudinally while the instrument with its probe portion, remains fixed.

In a further constructional embodiment, the invention is employed to support, within a gas turbine exhaust duct of circular section, the wall of which is free to expand longitudinally an exhaust cone; that is a conical fairing member disposed downstream of a turbine rotor to define with the exhaust duct an annular exhaust passage. The maintenance of concentricity of the exhaust cone in the duct is very desirable, particularly where the duct terminates in a propulsive jet orifice, but thermal distortion due to both radial and longitudinal expansion of the duct and cone during operation makes this difficult.

To meet this difficulty it has been proposed in the specification of British Patent No. 582,978 to provide at longitudinally spaced points in the exhaust duct, pairs of crossed rods each traversing the duct diametrically. The exhaust cone is supported on these rods and sufficient clearance is introduced where each rod passes through the wall of the cone to permit any necessary radial sliding so that during thermal distortion the cone will remain concentric.

At the regions where the crossed rods pass through the duct and cone walls, circumferential bands were provided respectively externally and internally of the walls of the duct described in British Patent No. 582,978, serving as reinforcing ribs as distinct from flexible bellows with which the present invention is concerned. This arrangement is satisfactory where the longitudinal spacing of the rods is not considerable.

When this spacing is considerable, however, differential longitudinal expansion between the duct and exhaust cone may be such that the cone is no longer free on the rods and the arrangement is rendered ineffective.

Figure 4:
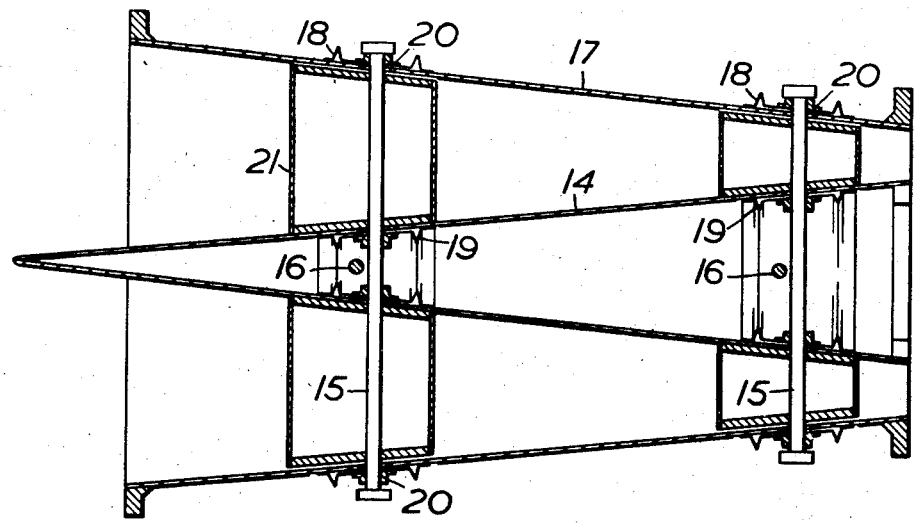
Figure 4 represents a longitudinal section of a gas turbine exhaust duct.

In the constructional embodiment of the invention now described, shown in axial cross-section in Figure 4, the support of the exhaust cone 14 which is, as shown, a hollow-walled structure is by means of longitudinally spaced pairs of crossed rods 15, 16 in the exhaust duct 17 generally as proposed in the abovementioned patent specification. The rods 15, 16 which support the exhaust cone by attachment to the wall of the exhaust duct 17 constitute structure relative to which the exhaust duct 17 is liable to move due to differential thermal expansion of the exhaust cone and the wall of the exhaust duct. External and internal bands 18, 19, with which the exhaust duct 17 and cone 14 are respectively provided in the region of each pair of crossed rods, provide a means of attachment for the rods 15, 16 and are constructed as flexible bellows in the manner hereinbefore described with reference to Figure 1. The rods 15, 16 each pass through closely fitting bushes 20 on the intermediate section of the bands 18, 19 of both the duct and cone and the walls of each of the latter are apertured to provide a clearance round the rods. The bands are thus free to expand or contract longitudinally to accommodate differential expansion between the duct and cone without seizing of the cone on the rods. Each rod is enclosed, between the duct and cone walls, by a streamlined fairing 21 attached to the cone at its radially inner end and having at its radially outer end a clearance from the duct wall to allow for expansion.

I claim:

1. In combination, a ducting for a high temperature fluid flow system having a tubular wall, structure relative to which said wall is free to move longitudinally and an interconnection between said wall and said structure comprising a continuous annular band extending peripherally of the wall, the band having two annular flanges secured to said wall at longitudinally spaced positions therealong, an annular intermediate section attached to the structure and extending longitudinally adjacent said wall and radially spaced therefrom, and two annular bellows sections, each flexible longitudinally of the wall and one attached to one flange and to one end of the intermediate section and the other bellows-section attached to the other flange and the other end of the intermediate section.

2. The combination according to claim 1 wherein that part of the wall spaced radially from said intermediate section is formed with aperture, said structure extends through said aperture with clearance longitudinally of the said wall and the flanges have a peripherally continuous fluid-tight attachment to the wall of the ducting at positions thereon spaced from said aperture.

3. In combination, a ducting for a high temperature fluid flow system including an outer tubular wall; an inner hollow walled member; said inner and outer members defining an annular flow path for fluid; a first continuous annular band extending peripherally of said outer member; a second continuous annular band extending peripherally of said inner member; said first band having two annular flanges secured to said outer member at longitudinally spaced positions therealong, an annular intermediate section extending longitudinally of said outer member in radial spaced relation therewith, and two annular bellows sections, each flexible longitudinally of the wall, one bellows section being attached to one flange and to one end of the intermediate section, and the other bellows section being attached to the other flange and to the other end of said intermediate section; said second band being similar to said first band and having two annular flanges secured to said inner member, an annular intermediate section and two annular bellows sections attached to the two annular flanges and to the opposite ends of said annular intermediate section, respectively; an interconnecting structure extending between the intermediate annular sections of said two bands; and means on each intermediate section connecting said structure to said intermediate sections.

References Cited in the file of this patent

UNITED STATES PATENTS

| | | |
|---|---|---|
| 2,172,612 | Hassentamm | Sept. 12, 1939 |
| 2,478,552 | Williamson | Aug. 9, 1949 |
| 2,516,819 | Whittle | July 25, 1950 |
| 2,616,728 | Pitt | Nov. 4, 1952 |
| 2,648,353 | Haworth | Aug. 11, 1953 |